UNITED STATES PATENT OFFICE.

ARTHUR BRIN, OF PARIS, FRANCE, ASSIGNOR TO THE CONTINENTAL OXYGEN COMPANY, (LIMITED,) OF LONDON, ENGLAND.

PROCESS OF MAKING BARIUM BIOXIDE.

SPECIFICATION forming part of Letters Patent No. 359,423, dated March 15, 1887.

Application filed April 21, 1886. Serial No. 199,658. (No specimens.) Patented in England June 29, 1885, No. 7,867.

*To all whom it may concern:*

Be it known that I, ARTHUR BRIN, a citizen of the Republic of France, and residing at 7 Rue Gavarni, Paris, in the said Republic, but temporarily residing at 5 Sydney street, in the county of Middlesex, England, chemist, have invented certain new and useful Improvements in the Manufacture of Bioxide of Barium and its use in Making Oxygenated Water for Bleaching or for other Purposes, (for which I have applied for a patent in Great Britain, No. 7,867, on the 29th June, 1885,) of which the following is a specification.

Up to the present time bioxide of barium has been prepared by the simple passage of atmospheric air through or over caustic baryta. This method offers the disadvantages that the caustic baryta absorbs carbonic acid and forms carbonate of baryta, which will not absorb oxygen, and a portion is transferred into hydrate of baryta, owing to the presence of aqueous vapor in the atmosphere.

My invention has for its object to produce bioxide of barium in an improved and practicable manner, and also eventually to manufacture from it an oxygenated water for use for bleaching or other purpose.

The reduction of nitrate of baryta is effected by placing the nitrate in receptacles and exposing it to a gradually-increasing temperature, according to the different phases of the reduction, and after having formed caustic baryta I remove the receptacles containing the baryta into a vessel which I hermetically close. This vessel I then heat, preferably from the under part, to a temperature of, say, about 800° centigrade, the receptacles being arranged in the said vessel in such a manner as to allow a free passage around them of the heated gases from the fire. I place the closed vessel in connection with a pump, so as to form in the said vessel a vacuum, say, of about seventy centimeters of mercury, in order to withdraw the nitrous vapors and gases of every kind, which would impede the subsequent absorption of oxygen by the baryta, and when these vapors and gases cease to be given off I admit oxygen to the said vessel, so that it may be taken up by the baryta and form bioxide of barium. This oxygen may be most conveniently admitted in the form of atmospheric air, which has previously had the carbonic acid and aqueous vapors or particles separated therefrom. This may conveniently be effected by passing the air through a vessel containing layers of lime and of caustic soda or other substances which will absorb or separate the carbonic acid and aqueous vapor or particles contained in the said air. I employ, preferably, the same pump which is used to create vacuum to cause the atmospheric air to pass through the chamber containing the lime and caustic soda or other suitable substances and to force this air, under pressure, over or through the baryta contained in the aforesaid vessel. A safety-valve which can be regulated should be provided in order to allow of the exit of the nitrogen which is liberated.

When the bioxide of barium is thus produced by the combination of oxygen with the baryta, I remove the said bioxide of barium from the vessel in which it has been produced and use it for any desired purpose. For example, I may pulverize it and dissolve it in acidulated water to make the bioxide of hydrogen known as "Thenard oxygenated water," which may be used for rapidly bleaching without deteriorating the materials treated.

I claim—

The process of producing bioxide of barium from the nitrate of barium, which consists in first heating the nitrate to form caustic baryta, then reheating the said caustic baryta in a closed vessel, then exhausting the nitrous and other gases which are given off, and then admitting to the heated caustic baryta atmospheric air, substantially as and for the purpose specified.

In testimony whereof I have signed my name to this specification in the presence of two subscribing witnesses.

ARTHUR BRIN.

Witnesses:
 CHAS. MILLS,
 CHAS. JAS. JONES,
 *Both of 47 Lincoln's Inn Field, London.*